(12) United States Patent
Chang et al.

(10) Patent No.: US 6,339,450 B1
(45) Date of Patent: Jan. 15, 2002

(54) ERROR RESILIENT TRANSCODING FOR VIDEO OVER WIRELESS CHANNELS

(75) Inventors: Shih-Fu Chang, New York, NY (US);
Justin Che-I Chuang, Holmdel, NJ (US); Gustavo De Los Reyes, Fair Haven, NJ (US); Amy Ruth Reibman, Matawan, NJ (US)

(73) Assignees: AT&T Corp; Columbia University, both of New York, NY (US)

( * ) Notice: Subject to any disclaimer, the term of this patent is extended or adjusted under 35 U.S.C. 154(b) by 0 days.

(21) Appl. No.: 09/399,689

(22) Filed: Sep. 21, 1999

(51) Int. Cl.⁷ .................................................. H04N 7/04
(52) U.S. Cl. ......................... 348/470; 348/192; 348/466
(58) Field of Search .................................. 348/469, 470, 348/192, 193, 387.1, 425.2, 466, 390.1; H04N 7/04, 7/12

(56) References Cited

U.S. PATENT DOCUMENTS 5,534,937 A  * 7/1996 Zhu ........................... 348/466

5,793,895 A     8/1998 Chang et al.

* cited by examiner

Primary Examiner—Sherrie Hsia

(57) ABSTRACT

A method and system for maintaining the quality of video transported over wireless channels uses a transcoder to modify and maintain the optical resilience of an encoded bitstream. The transcoder increases the spatial resilience by reducing the number of blocks per slice, and increases the temporal resilience by increasing the proportion of I-blocks that are transmitted in each frame. Also, the transcoder maintains the same input bit rate by dropping less significant coefficients as it increases resilience. The transcoder of the present invention maintains the resilience at an optimal level to accommodate the prevailing channel conditions as measured by the BER of the wireless channel. Rate distortion theory is applied to determine the optimal allocation of bit rate among spatial resilience, temporal resilience and source rate, where it is has been found that the optimal allocation of the present invention (which occurs in near-real time) provides nearly the same result as doing an exhaustive search.

8 Claims, 11 Drawing Sheets

SYSTEM FRAMEWORK FOR TRANSCODING WITH FEEDBACK
10

HIGH-LEVEL TRANSCODER FUNCTIONALITY
16

TRANSCODING FOR SPATIAL RESILIENCE

HISTOGRAM OF BURSTS OF LENGTH 1 TO 10 WITH JAKES ERRORS

HISTOGRAM OF BURSTS OF LENGTH 2 TO 10 WITH JAKES ERRORS

HISTOGRAM OF BURSTS OF LENGTH 1 TO 10 WITH BERNOULLI ERRORS

HISTOGRAM OF BURSTS OF LENGTH 2 TO 10 WITH BERNOULLI ERRORS

COMPARISON OF EFFECT OF BERNOULLI (INDEPENDENT) ERRORS AND JAKES (BURSTY) ERRORS

EFFECT OF DOPPLER FREQUENCY AND BERNOULLI ERRORS ON VIDEO QUALITY

RESULTS OF SPATIAL RESILIENCE FOR BERNOULLI BIT ERRORS

TRANSCODING FOR TEMPORAL RESILIENCE

SCHEMATIC PROPAGATION OF CORRUPTION VIA BIT ERRORS AND MOTION COMPENSATION

INVARIANT DISTRIBUTION OF MARKOV MODEL AS A FUNCTION OF THE PROBABILITY OF I-BLOCKS

OPERATIONAL RATE DISTORTION FUNCTION FOR SOURCE RATE (FROM SIMULATION)

SLOPE OF OPERATIONAL RATE DISTORTION FUNCTION FOR SOURCE RATE

RATE DISTORTION FUNCTION FOR TEMPORAL RESILIENCE (FROM ANALYTICAL MODEL)

SLOPE OF RATE DISTORTION FUNCTION FOR TEMPORAL RESILIENCE

FIG. 21  VARIATION OF OPTIMAL OPERATING POINT WITH BER
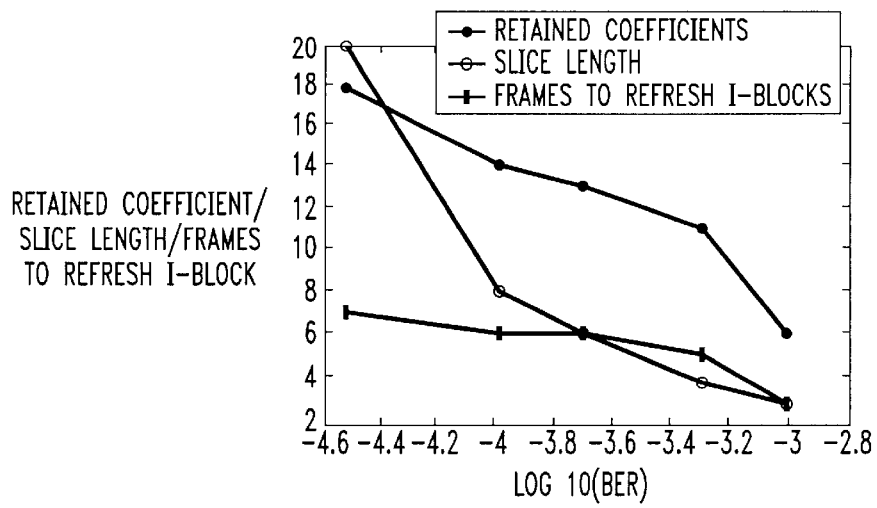
FIG. 22  VIDEO QUALITY AS FUNCTION OF SOURCE RESILIENCE
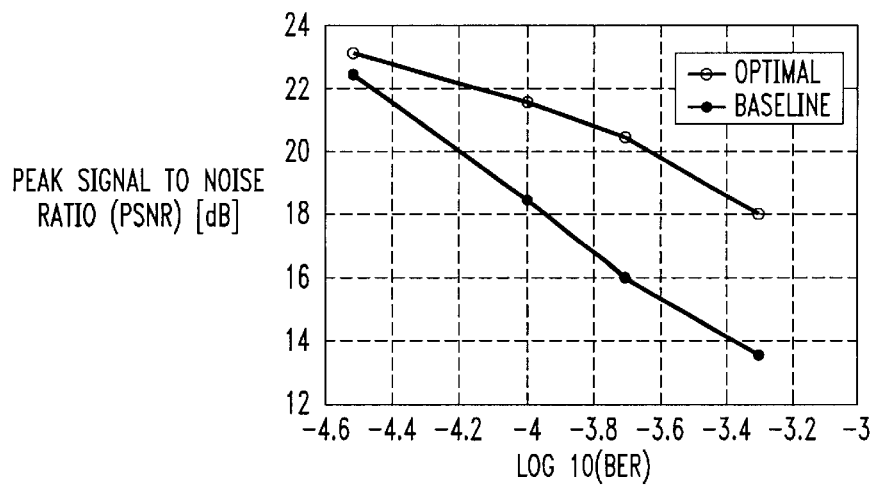
FIG. 23
ALGORITHM FOR COMPUTING AND SETTING OPTIMAL RESILIENCE
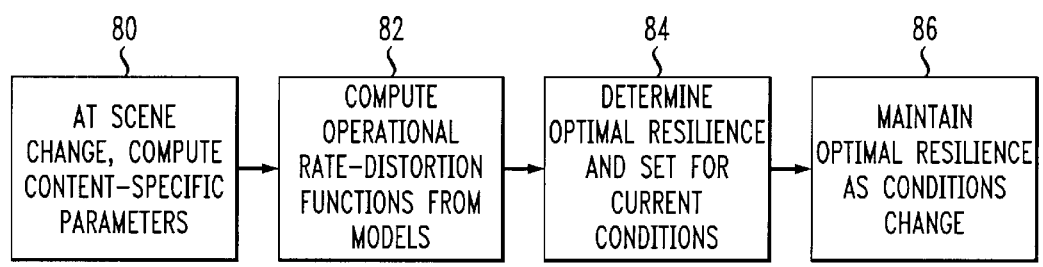

ERROR RESILIENT TRANSCODING FOR VIDEO OVER WIRELESS CHANNELS

TECHNICAL FIELD

The present invention relates to a technique for introducing error resilience in video transmission over a wireless channel and, more particularly, to the utilization of a transcoder in the wireless communication path to inject resilience into video transmission over the wireless channel.

BACKGROUND OF THE INVENTION

Traditional "wired" communication channels for video signals have relatively high bandwidth and consistently low bit error rates. This is in stark contrast to the wireless environment, where a typical wireless channel generally exhibits a lower bandwidth and an error rate that is both greater than the wired channel and time-varying—both during a given transmission as well as from one transmission to another.

The time-varying conditions of a wireless channel may, ideally, use feedback from the decoder to the encoder to adapt its coding parameters (for example, bit rate) to the time-varying conditions. However, such a solution is not practical in many situations. First, in a multicast environment (very typical of video transmission), an encoder can only produce a single bitstream, while each receiver may have different capabilities due to the characteristics of both the end terminal and the wireless channel. Additionally, in applications in which a compressed video bitstream is stored for future delivery, the encoder cannot, in real time, directly change the resilience of the bitstream. Lastly, an encoder designed for use on a "wired" channel is usually not cognizant of the characteristics of any "wireless" hops that may be included on the signal path. That is, an encoder will generally operate without knowledge of any wireless hops between the encoder and decoder. There is, and will continue to be, an embedded base of encoders designed to generate bitstreams optimized for reasons other than resilience in wireless channels.

Previous transcoders have been limited in their functionality to only reduce the bit rate of the video signal from the encoder, operating under the implied assumption that resilience can only be increased via channel coding, such as forward error correction (FEC) or automatic repeat request (ARQ). However, using only channel coding limits the type of resilience that can be employed and does not take advantage of source coding methods to improve the resilience. In some cases, the decoding end may not be capable of implementing channel coding methods and must rely on the source-coding methods.

Based on all of the above, therefore, a need remains in the art for a robust transcoder for use in wireless communication channels that provides improved error resilience than is possible with pure bit reduction.

SUMMARY OF THE INVENTION

The need remaining in the prior art is addressed by the present invention, which relates to a technique for introducing error resilience in video transmission over a wireless channel and, more particularly, to the utilization of a transcoder in the wireless communication path to inject resilience into video transmission over the wireless channel.

In accordance with the present invention, a transcoder is implemented that provides both spatial and temporal resilience, then uses rate distortion theory, in conjunction with the source rate, to provide an output to the decoder at the same bit rate as the original encoded signal. In particular, the transcoder of the present invention selects an appropriate resilience and compression technique based upon the spatial and temporal errors discovered in the incoming bitstream. The characteristics of the wireless channel are also factored into the analysis so that the output video bitstream matches as closely as possible the wireless transmission channel.

Other and further aspects of the present invention will become apparent during the course of the following discussion and by reference to the accompanying drawings.

BRIEF DESCRIPTION OF THE DRAWINGS

Referring now to the drawings,

FIG. 21 illustrates the optimal operating point as a function of BER;

FIG. 22 contains a graph of video quality using the optimal operating point; and FIG. 23 contains a flowchart associated with estimating content-specific parameters.

DETAILED DESCRIPTION

Figure 1:
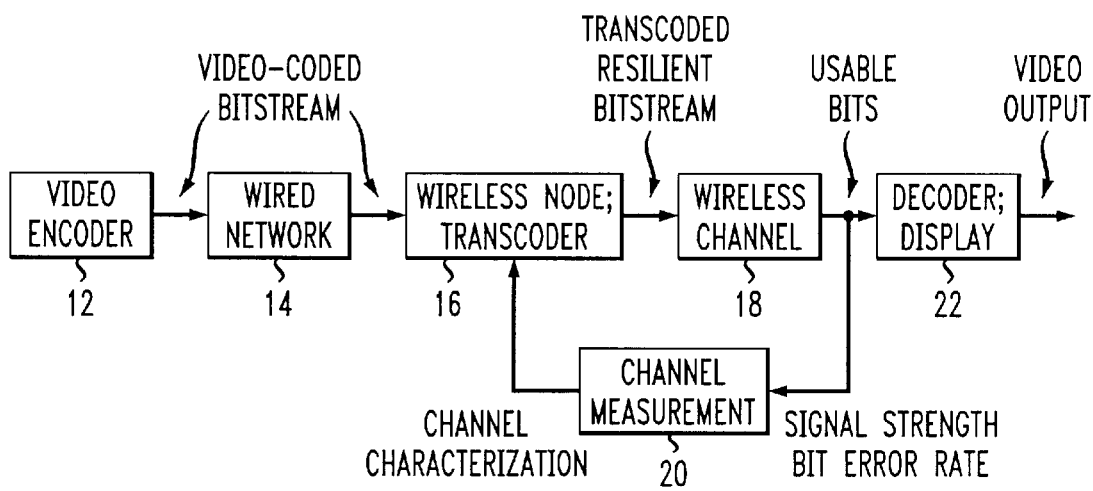
FIG. 1 illustrates an exemplary system framework for utilizing video transcoding in accordance with the present invention.

An exemplary system-level architecture 10 incorporating the transcoding scheme of the present invention is illustrated in FIG. 1. For the purposes of the present invention, it will be presumed that the original video signal is generated within a "wired" network and, as such, needs to exit the transmitter suitable for any one of a "wired", "wireless", or "hybrid" (i.e., wired and wireless) network. Referring to FIG. 1, the original video signal at the transmitter is first encoded using a conventional encoder 12. In most cases, the first portion of the communication path will be provided by a standard "wired" network, represented by element 14 in FIG. 1. The "wired" network may comprise, for example, a cable network. As mentioned above, wired channels, by their nature, exhibit a relatively high bandwidth and a relatively low bit error rate (BER). Therefore, as long as the video signal remains on wired network 14, the video coded bitstream will remain relatively error-free. In accordance with the environment of the present invention, where the video-coded bitstream will traverse at least one wireless "hop", a transcoder 16 is disposed within architecture 10 and receives as a first input the video-coded bitstream exiting wired network 14. As will be described in greater detail hereinbelow, transcoder 16 of the present invention functions to modify the already encoded bitstream for the purpose of improving its resilience prior to transmission over a noisy wireless channel 18. In particular, a transcoder formed in accordance with the present invention functions to modify the amount of spatial and temporal localization in incoming video bitstream, denoted $V_{IN}$, allowing the bitstream to be tailored to suit the prevailing characteristics of the wireless channel.

Spatial error propagation can occur when the decoder looses synchronization with decoding the variable length codes. One approach to combat this effect is to shorten the length of a slice by inserting additional synchronization headers. That is, a shorter slice allows the decoder to re-synchronize more quickly, resulting in less lost data. For temporal localization, a primary resilience technique is to transmit more intra-frame (I-frames) or intra-blocks (I-blocks). These frames or blocks are coded to be temporally independent of previous frames or blocks and are used as references for subsequent temporal prediction, where more frequent I-blocks reduce the duration of error propagation.

As mentioned above, transcoder 16 also functions to modify the encoded video signal as a function of the characteristics of the subsequent wireless channel. To that end, a channel measurement feedback element 20 is disposed between the output of wireless channel 18 and the input of transcoder 16. Channel measurement feedback element 20 functions to characterize one or more parameters of the wireless channel (such as, for example, the bit error rate) and supply this information as an input signal (denoted $C_{IN}$) to transcoder 16 for it to use in selecting the proper resilience techniques. Ultimately, the transcoded resilient bit stream, denoted $V_{OUT}$ in FIG. 1, is received by a decoder display 22 (such as a computer terminal, television, or other video monitor) to provide the desired video output.

Figure 2:
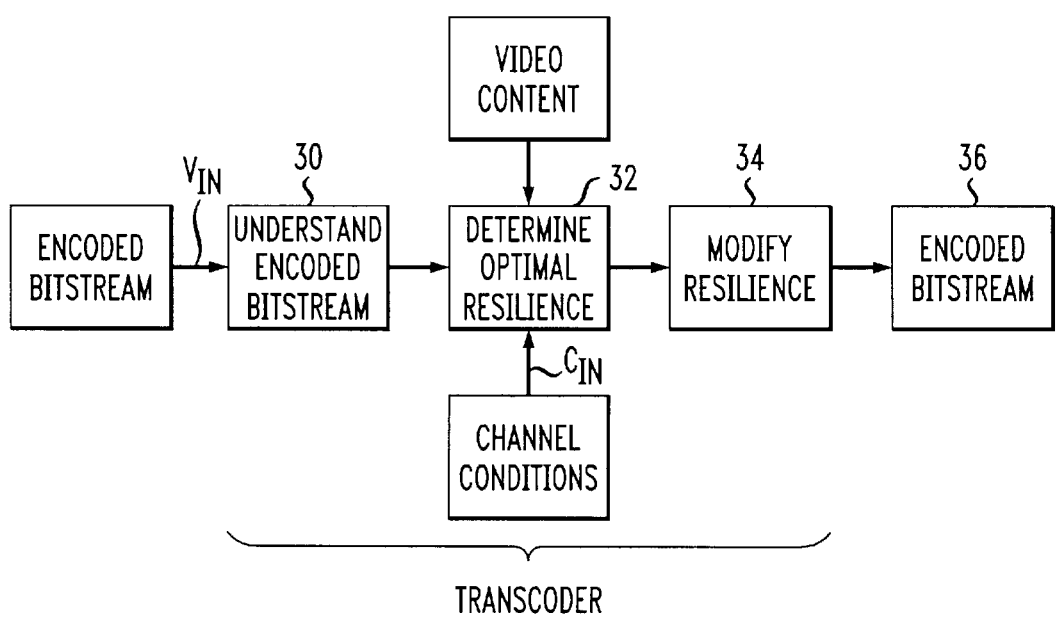
FIG. 2 shows, in simplified block diagram form, the various operations performed by a transcoder of the present invention.

A slightly more in-depth view of the operation of transcoder 16 is illustrated in FIG. 2. The incoming video-coded bitstream $V_{IN}$ is first applied as an input to a quasi-decoder 30. Quasi-decoder 30 functions to generate a "rough" decoding of $V_{IN}$, forming a video content portion $V_{IN}$. As mentioned above, a signal representing the characteristics of the following wireless channel, denoted $C_{IN}$ is also generated. Referring to FIG. 2, both $V_{IN}$ and $C_{IN}$ are applied as inputs to resilience coding element 32. Based upon the video signal errors recognized by coding element 32, as well as the characteristics of the following wireless channel, coding element 32 chooses the appropriate amount of spatial and temporal resilience to be applied, then forwards this information to element 34, which applies the chosen resilience to video content portion $V_{IN}$, forming a transformed signal denoted $V_{OUT}$. Transformed signal $V_{OUT}$ is subsequently "re-encoded" within element 36 to maintain the same bit rate as the original bitstream $V_{IN}$, thus exiting transcoder 16 as resilience-encoded video signal $V_{OUT}$.

Figure 3:
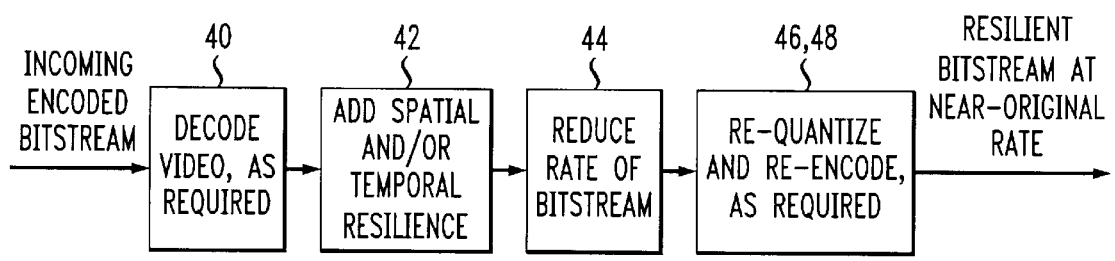
FIG. 3 contains a flowchart illustrating the various operations performed by a transcoder of the present invention.

A flowchart illustrating the transcoding steps of the present invention is shown in FIG. 3. As discussed, the incoming video bit stream, $V_{IN}$ is decoded (block 40) is decoded (i.e., $V_{IN}$) to the degree required to add resilience, as will be discussed in detail below. Resilience—in terms of temporal and/or spatial—is then added to the decoded bitstream (block 42) and the resultant bit rate is reduced, as necessary (represented by block 44). The resilient bitstream, $V_{OUT}$, is then re-quantized (to compensate for the introduced temporal resilience, shown as block 46) and variable length re-encoded (block 48) to form resilient encoded video output $V_{OUT}$.

Figure 4:
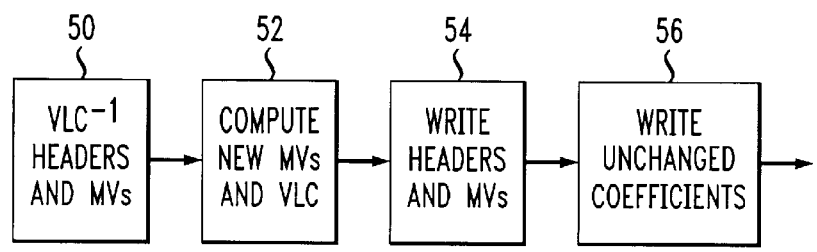
FIG. 4 shows a preferred sequence of operations associated with transcoding for spatial resilience.

A flowchart illustrating the steps associated with spatial resilience is shown in FIG. 4. In general, the spatial localization technique of adding more slice headers requires only simple bitstream parsing and arithmetic operations. A variable-length decoder first parses the bitstream (block 50) and inserts additional slice start codes where necessary. In addition, motion vectors (denoted "MV") are decoded. Following this, new "differential" MVs are calculated from reference MVs only within the current slice (block 52). The additional slice start codes and the differential MVs are written into the decoded video (block 54), then subjected to variable length encoding (block 56) to form the output signal.

There are two models that can be used to describe spatial (within a frame) corruption propagation. One model uses independent bit errors and the other model uses burst errors as the source of corruption. Within an analysis of each model, different characterizations of the wireless channel can be analyzed. In particular, the first model describes the situation of independent bit errors produced by a channel that is uncorrelated in time. The latter describes the case of a bitstream subjected to a combination of uncorrelated and bursty errors. Such errors would be produced by a time-correlated channel such as a Rayleigh-fading wireless channel.

For the purposes of the present invention, the mean bit error rate (BER) and Doppler frequency will be used as the measure of channel conditions, with the number of blocks per slice used as the measure of spatial resilience. Generally, for block-based encoded bitstreams, once the decoder detects an error, it discards the block containing the error and all subsequent blocks until the next synchronization (i.e., slice) header. An assumption is made that every bit error results in an error that is detected by the decoder. This overestimates the number of lost blocks but does not characterize the distortion caused by errors that cannot be detected from video syntax.

The expected block losses can be described generically by the following probabilistic equation:

$$E\left[\frac{X_{n,loss}}{slice}\right] = \sum_{i=0}^{l-1}\{(l-i)[P(\text{block } i \text{ through block } (l-1) \text{ are lost})]\} \quad \text{(Eq. 1)}$$

where $X_{n,loss}$ are the lost blocks lost, i is the position of the block within the slice starting from position 0, and l is the length of the slice in blocks.

This expected loss expression can be further tailored as a function of the different channel types described above. For independent bit errors (produced by a channel that is uncorrelated in time), the probability that block i and all subsequent blocks in the slice are lost is equal to the probability that no bit errors occur in blocks 0 to (i−1) and at least one bit error occurs in block i. Therefore, assuming a constant block length in bits, the expected number of blocks lost per slice is:

$$E\left[\frac{X_{n,loss}}{slice}\right] = \sum_{i=0}^{l-1} \{(l-i)[(1-P_e)^{ic+h} - (1-P_e)^{(i+1)c+h}]\} \quad \text{(Eq. 2)}$$

where $P_e$ is the probability of error (or BER), h is the header length, and c is the constant length of the block in bits. While this expression is useful for independent bit errors, wireless channels are frequently characterized by a combination of independent bit errors and time-correlated burst errors. In general, burst errors can be defined using the following parameters: a sequence of error bits $e_{l+1}, e_{l+2}, \ldots, e_{l+b}$ is called a "burst of length b" relative to a guard space of length g if: (1) $e_{l+1}=e_{l+b}=1$; (2) the g bits preceding $e_{l+1}$ and the g bits following $e_{l+b}$ are all 0's; and (3) the b bits from $e_{l+1}$ through $e_{l+b}$ contain no sequences of g 0's.

Figure 5:
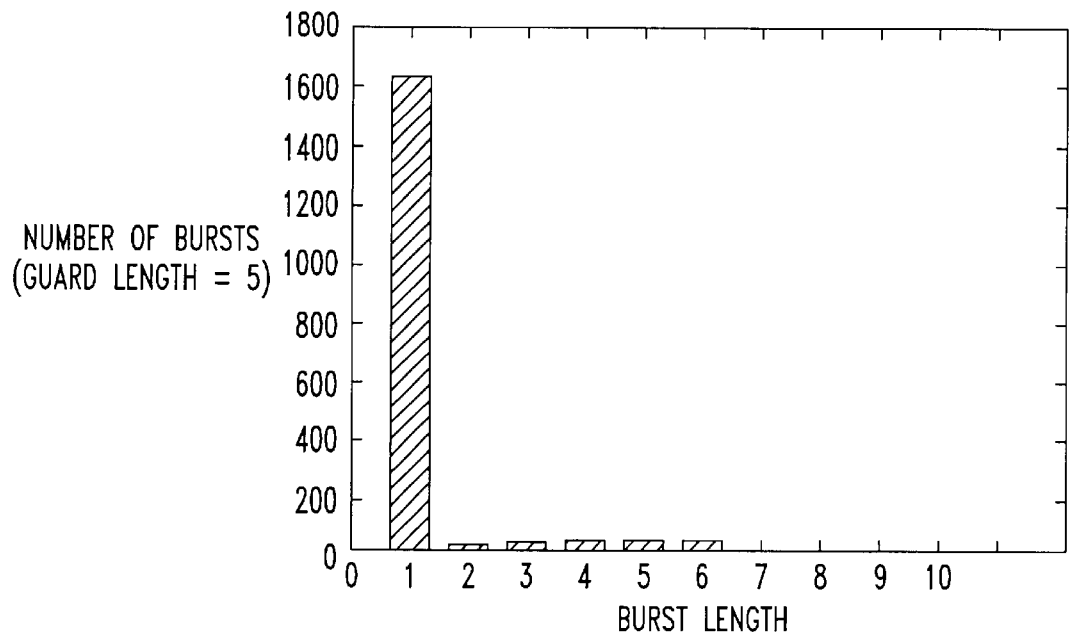
FIGS. 5–8 are a set of histograms illustrating errors on a wireless channel, FIGS. 5 and 6 associated with a Jakes channel model (bursty errors) and FIGS. 7 and 8 associated with a Bernoulli model (independent bit errors)
Figure 6:
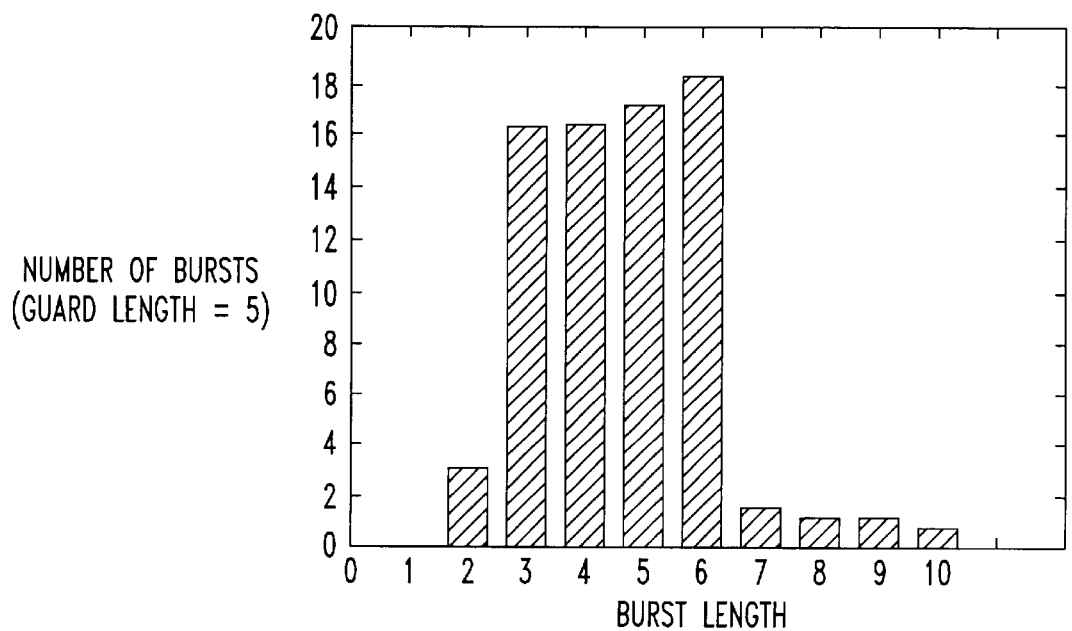
Figure 7:
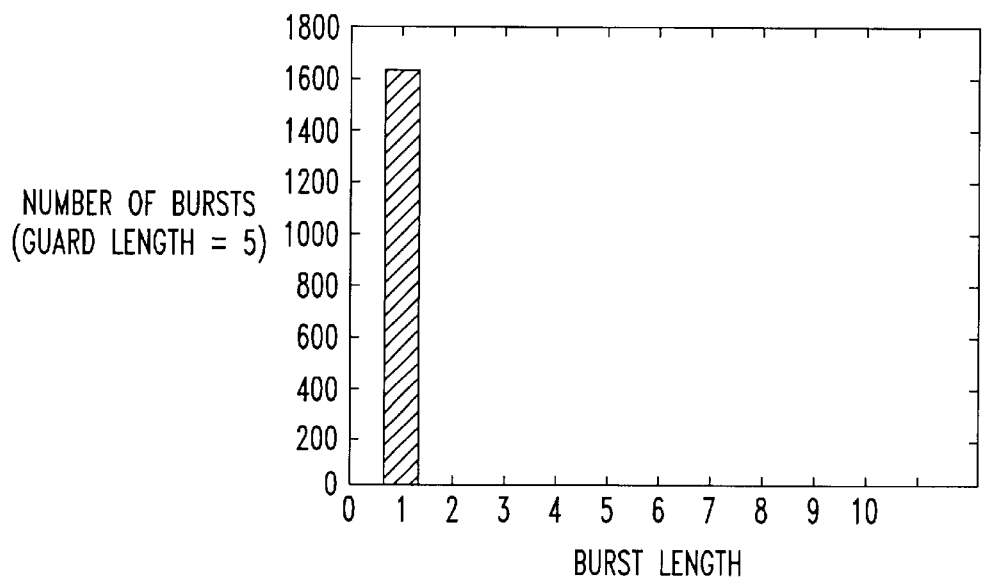
Figure 8:
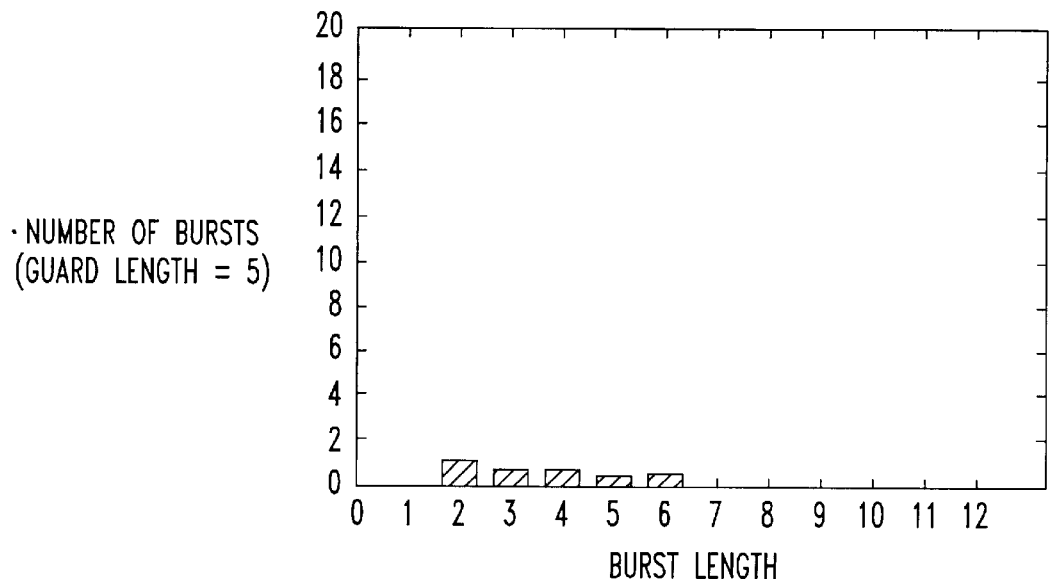

Based on the above definition of bursts, a histogram of burst errors for the well-known Jakes model of a wireless channel is shown in FIGS. 5–8. Typical results show the average number of bursts in a video sequence. These examples use a guard length of five bits. For a Jakes-model wireless channel, FIG. 5 shows the histogram for bursts of length 1 to 10 and FIG. 6 shows a close-up of the bursts between length 2 and 10. In contrast, FIGS. 7 and 8 illustrate histograms associated with the independent bit error channel model described above (also referred to as the Bernoulli model). As expected, the Bernoulli channel has far fewer burst errors than the Jakes channel. For the purposes of the present invention, it will be presumed that the Jakes bit error pattern is a decomposition of independent bit errors and time-correlated burst errors.

Figure 9:
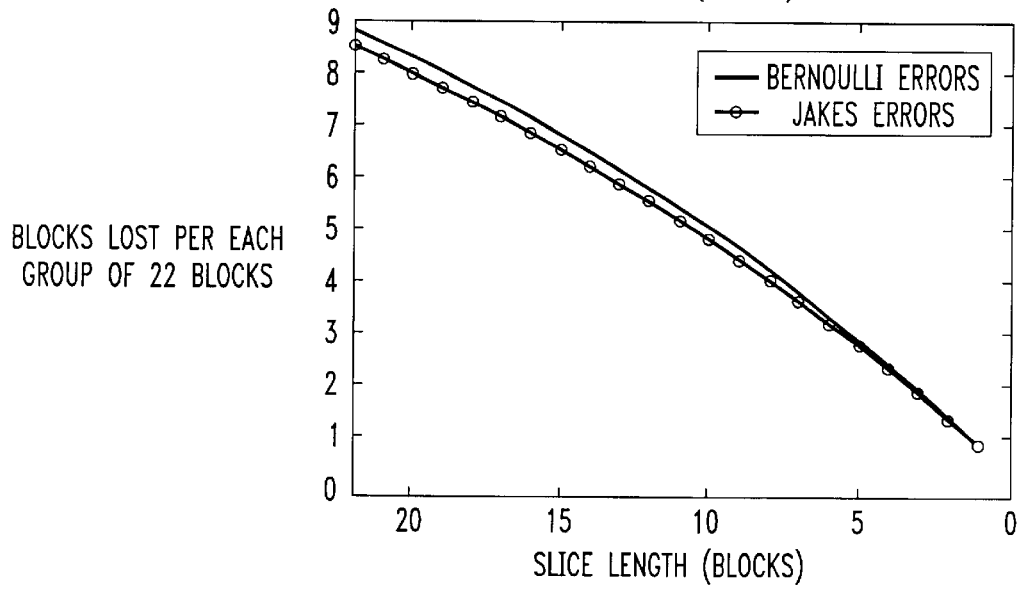
FIG. 9 is a graph illustrating lost blocks as a function of slice length, for both Jakes and Bernoulli models.

With this decomposition of independent and burst errors, the generic expected block loss as expressed in equation (1) can be modified in a straightforward fashion. As with the case of independent bit errors, the probability that block i and all subsequent blocks in the slice are lost is equal to the probability that no bit errors occur in blocks 0 to (i−1) and at least one bit error occurs in block i. With the assumption that the definition of "bit errors" include errors that occur either singly or in bursts, equation (1) can be expressed as follows:

$$E\left[\frac{X_{n,loss}}{slice}\right] = \sum_{i=0}^{l-1} \{(l-i)[(1-P_{effective})^{ic+h} \quad \text{(Eq. 3)}$$
$$(1-P_{burst})^i[1-(1-P_{effective})^c(1-P_{burst})]\}$$

where $P_{effective}$ is the uncorrelated bit error rate (using burst lengths of one), $P_{burst}$ is the probability of getting a burst error in a block, h is the header length, and c is the constant length of the block in bits. The independent bit error rate is calculated by the proportion of independent bit errors to the total bits in the video sequence. The probability of getting a burst error in a block can be found by dividing the total number of bursts by the total number of blocks in the video sequence. By "bunching" some of the bit errors, the net effect of bursts is a reduction in the number of block losses in the video for a given BER. This result in shown in FIG. 9 for a bit error rate of 5×10⁻⁴ and a Doppler frequency equivalent to a velocity of approximately 6 mph. In particular, FIG. 9 is a graph illustrating lost blocks as a function of slice length for both the Jakes and Bernoulli models. As shown, for decreasing slice length (as measured in blocks), the Jakes and the Bernoulli models converge, obtaining essentially identical measures of lost blocks as the slice length becomes less than five.

Figure 10:
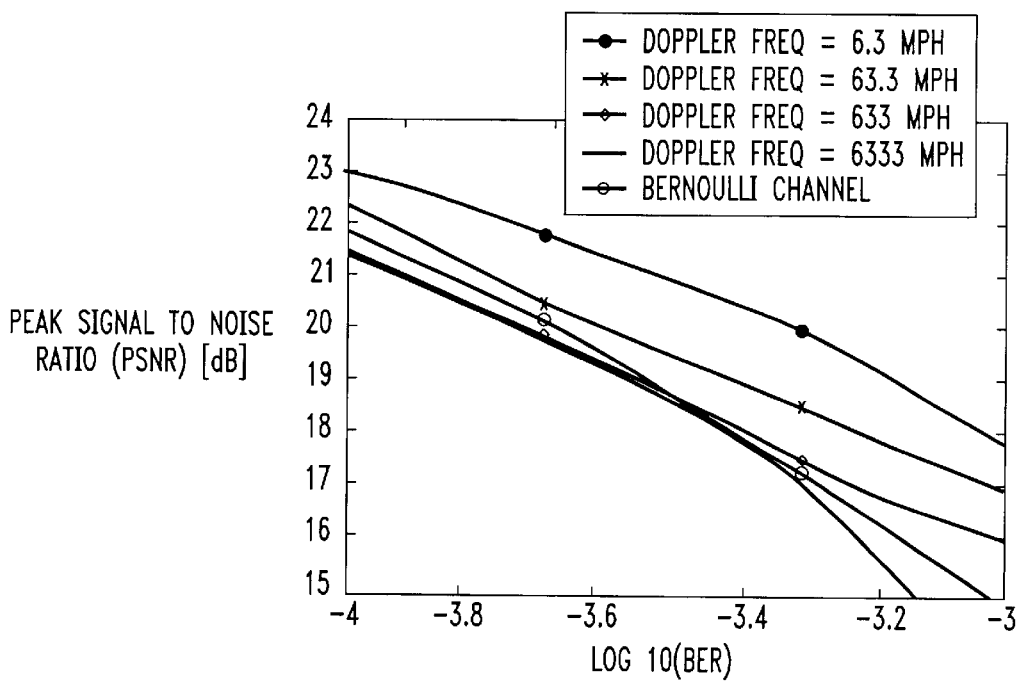
FIG. 10 is a graph illustrating channel errors as a function of Doppler frequency.

Another useful comparison of the Jakes and Bernoulli models is to observe their differences as a function of Doppler frequency. FIG. 10 illustrates channel errors as various Doppler frequencies (equivalent to a velocity range of 6.3 mph to 6333 mph). Generally, FIG. 10 shows that video quality increases as Doppler frequency decreases, where as the frequency decreases, the "burstiness" of the channel increases. Therefore, since the errors are grouped within blocks, they affect fewer blocks.

Figure 11:
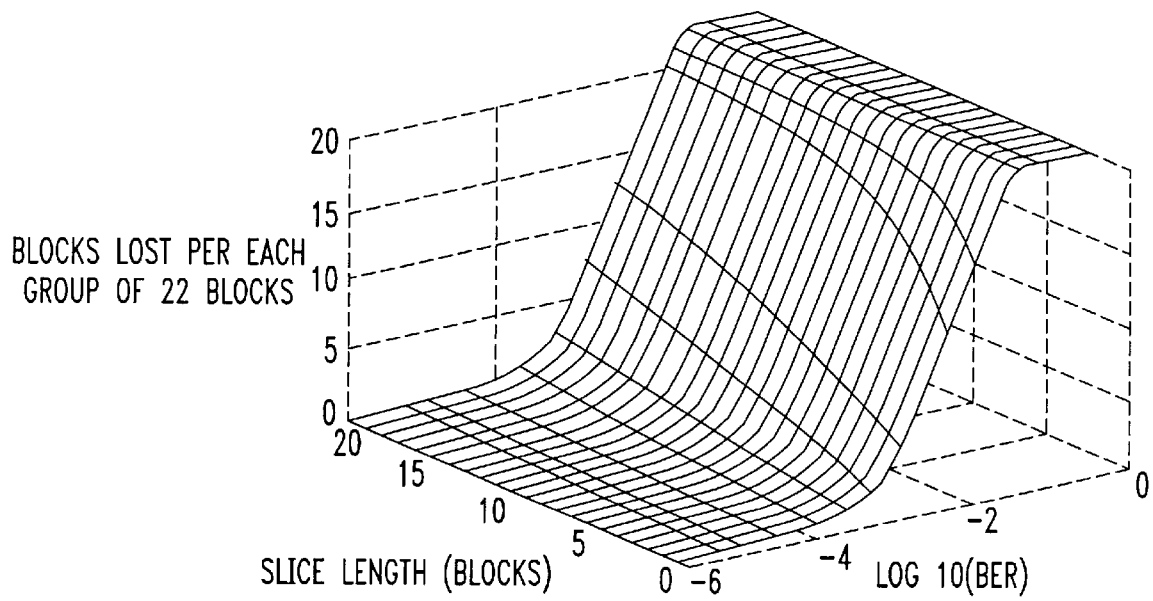
FIG. 11 is a three-dimensional plot illustrating the results of spatial resilience for a Bernoulli-modeled wireless channel.

Summarizing, the result of the spatial resilience model for the independent, uncorrelated (Bernoulli) bit errors is shown in FIG. 11. As discussed above, the result for burst error (Jakes model) losses will be similar to these results, except for a reduction in magnitude. Referring to FIG. 11, it is shown that increasing resilience in the form of shorter slices leads to a lower number of expected block losses. Also evident from the graph of FIG. 11 is the strong non-linearities across both resilience and bit error rate. The effect of high spatial resilience is especially strong at the higher BER. In accordance with the present invention, an operating point for spatial resilience can be selected by taking advantage of these non-linearities to produce the best video quality in the presence of bit errors.

Figure 12:
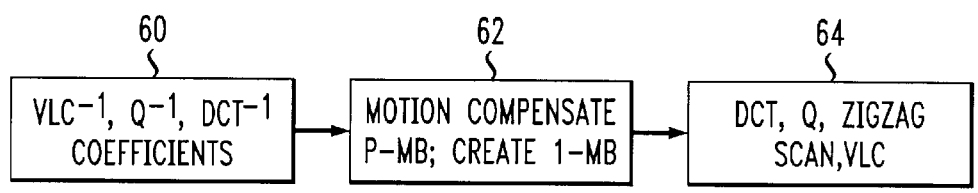
FIG. 12 contains a flowchart showing a preferred sequence of operations associated with transcoding for temporal resilience.

Transcoder 16 of the present invention requires a slightly more complicated processing to increase the temporal resilience by using more frequent intra-blocks (i.e., I-blocks). FIG. 12 contains an overview flowchart illustrating the steps associated with the temporal resilience aspect of the present invention. As shown, incoming bitstream $V_{IN}$ is first fully decoded (block 60), including motion compensation. The new I-blocks are then created (block 62) and the coefficients of those I-blocks to be transmitted are then discrete-cosine transform (DCT) coded, re-quantized, scanned and variable-length encoded (block 64). Since motion estimation is not used, the implementation of temporal resilience in transcoder 16 is considerably less computation-intensive that a full decoding and re-encoding. In particular, the temporal model incorporates corruption that comes from bit errors or is spread through motion compensation. In addition, the model takes into account the effect of increased temporal resilience on limiting the spread of corruption. In accordance with the present invention, temporal resilience is increased by transmitting a higher portion of I-blocks each frame.

Figure 14:
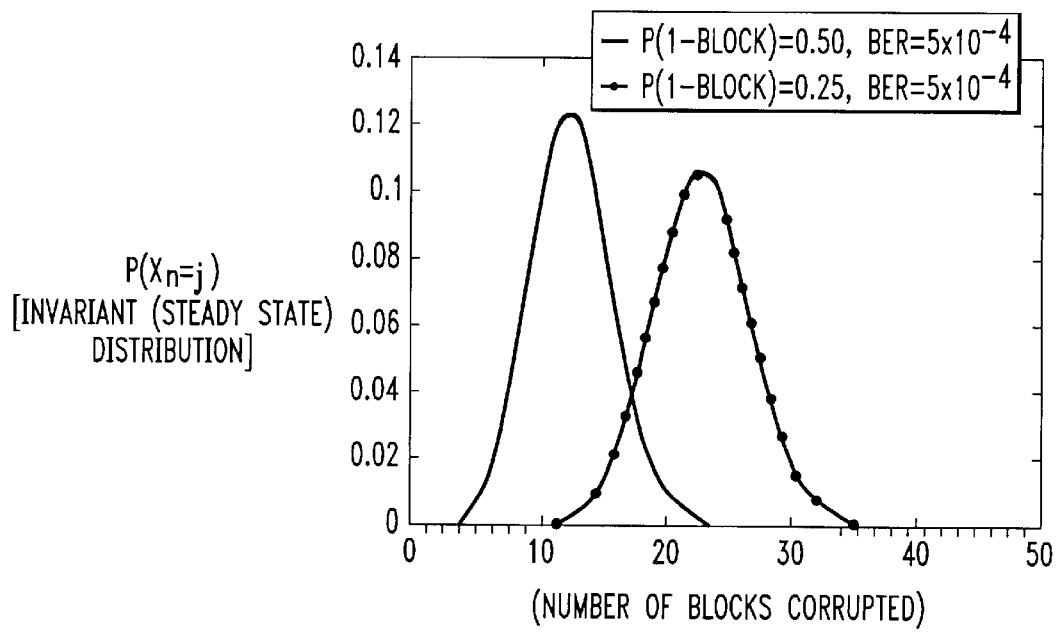
FIG. 14 is a graph illustrating the steady-state distribution of Markov model as a function of the probability of I-blocks.

Block-based, motion-compensated encoded video subjected to bit errors lends itself naturally to using a Markov model as shown in FIG. 14 that depends only on the current and previous states. That is, the number of corrupted blocks in the current frame depends on the following: (1) the input errors for the current frame; (2) the motion vectors in the current frame; and (3) the number of corrupted blocks in the previous frame. The overall corruption propagation model calculates the number of corrupted blocks in each video frame as the sum of the number of blocks corrupted due to bit errors and the number of blocks corrupted doe to motion compensation minus the intersection between the two types of corrupted blocks. Therefore, the number of corrupted blocks, $X_n$, within frame n can be expressed as follows:

$$X_n = X_{n,mc} + X_{n,loss} - (X_{n,mc} \cap X_{n,loss}) \quad \text{(Eq. 4)}$$

where mc indicates corruption due to motion compensation, and loss indicates corruption due to bit errors. Folding the spatial model into the Markov model, the above equation can be simplified using the expected value of $X_{n,loss}$. As a result, equation (4) can be rewritten as follows:

$$X_n = X_{n,mc} + E[X_{n,loss}] - (X_{n,mc} \cap E[X_{n,loss}]) \text{ We estimate the intersection as } X_{n,mc} \cap X_{n,loss} = rE[X_{n,loss}] \quad \text{(Eq. 5)}$$

where $$r = \frac{X_n}{F}$$

and F is the total number of blocks in a frame.

The intersection of $X_{n,mc}$ and $X_{n,loss}$ can be expressed as $rE[X_{n,loss}]$, where $r=X_n/F$ (F being the total number of blocks in a frame).

With this simplification for $X_n$, the results from the above-described spatial models can be readily incorporated into the temporal model through the $E[X_n]$ term in the above equation. That is, by estimating the intersection as discussed above, the effect that more intersections occur as either the number of corrupt blocks or the number of lost blocks increases is captured.

Figure 13:
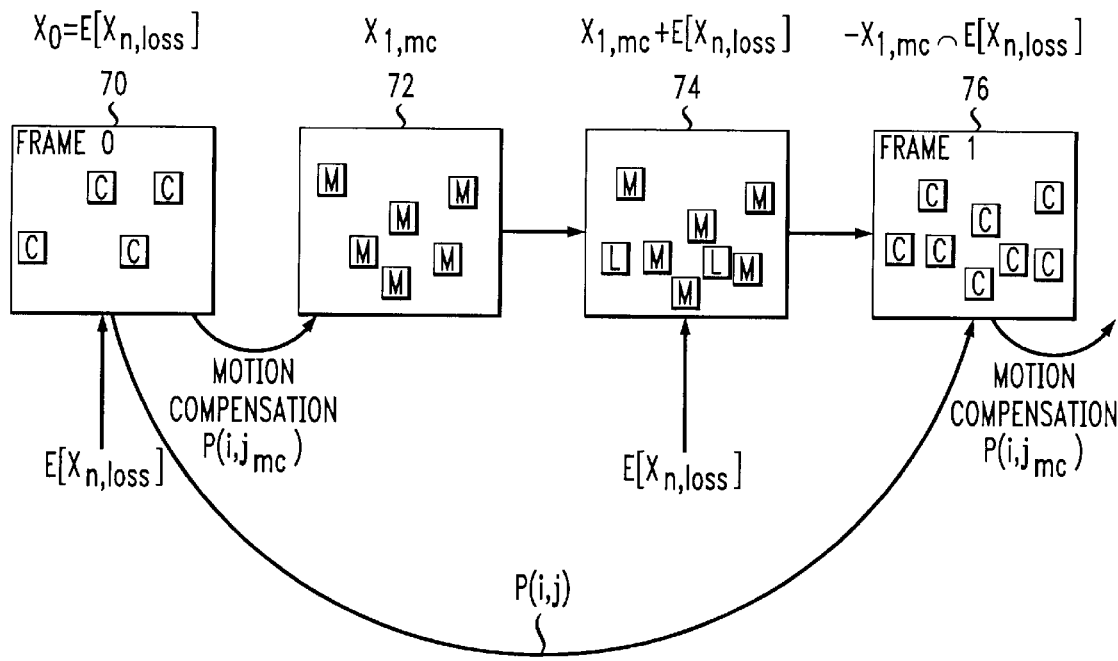
FIG. 13 contains a schematic block diagram illustrating error propagation.

FIG. 13 shows schematically how the spatial models and the motion-compensated Markov model can be used together to describe the overall propagation of corruption. The large squares 70, 72, 74 and 76 indicate video frames, and the smaller squares 80 represent corrupted blocks within each frame. The letters C, M and L within each square 80 denote "combined" corrupted blocks, "motion compensation" corrupted blocks, and "losses" due to channel bit errors, respectively. In initial frame 70, losses are introduced due to bit errors. These losses are propagated through motion compensation via the transition matrix $P(i,j_{mc})$, as will be described hereinafter. According to equation (5), new losses are introduced in frame 72 due to bit errors, and intersecting losses (illustrated in frame 74) are removed, as shown in frame 76. This results in the combined corruption due to both bit-error losses and motion compensation. However, when the corruption due to bit errors and the corruption due to motion compensation are related as described in equation (5), the propagation of corruption from frame 72 to frame 76 can be calculated directly by the transition matrix $P(i,j)$. The process is then repeated for each subsequent frame.

Within each frame, a block is corrupted via motion compensation when it references corrupt data in the previous frame. This can be considered a Bernoulli process with probability of success, p. Therefore, each frame is treated as a set of independent trials, one for each block in the frame, and each trial can result in a block being corrupted or not corrupted. The probability that a block is corrupted depends on the corruption in the previous frame, the distribution of motion vectors in the current frame, the blocks lost in the current frame, and the number of I-blocks transmitted in the current frame. In accordance with the teachings of the present invention, the proportion of I-blocks transmitted in each frame is a measure of the temporal resilience.

Based on this, the transition matrix that governs the propagation of errors from frame to frame due to motion compensation is governed by the following binomial process:

$$P(i, j_{mc}) = P\{X_{n+1,mc} = j_{mc} \mid X_n = i\} = \binom{k}{j_{mc}} p^{j_{mc}} (1-p)^{k-j_{mc}} \quad \text{(Eq. 6)}$$

where $X_n$ is the number of corrupted blocks in frame n, $X_{n+1,mc}$ is the number of corrupted blocks due to motion compensation in frame n+1, p is the probability that a block is corrupted via motion compensation, k is the number of blocks in a frame, and $i, j_{mc} = 0, 1, \ldots, k$. It is to be noted that the dependency of $P(i,j_{mc})$ on i is through p, which is a function of the corruption in the previous frame n.

When $X_n$ and $X_{n,mc}$ are related as shown in equation (5), then the overall transition matrix governing corruption can be derived from equations (5) and (6) as follows:

$$P(i, j) = P\{X_{n+1} = j \mid X_n = i\} = \binom{k}{j} p^j (1-p)^{k-j} \quad \text{(Eq. 7)}$$

where $X_{n+1}$ is the number of corrupted blocks due to combined motion compensation and block losses in frame n+1. With the transition matrix known, the expected number of corrupted blocks doe to motion compensation and bit errors in each video frame n can be determined from the n-step transition probabilities:

$$P^n(i,j) = P\{X_n = j \mid X_0 = i\} \quad \text{(Eq. 8)}$$

The expected number of corrupted blocks in each frame in the video can then be expressed as:

$$E[X_n \mid X_0 = i] = \sum_{j=0,1,\ldots,k} j P\{X_n = j \mid X_0 = i\} = \sum_{j=0,1,\ldots,k} j P^n(i,j) \quad \text{(Eq. 9)}$$

where i is the number of corrupted blocks in the first frame, n=0. From the above equation, it can be seen how this model describes the error propagation frame by frame. The corruption in each frame, n, is therefore a function of the n-step transition probabilities for that frame.

The probability, denoted p, that a block is corrupted through motion compensation must be determined so that the above transition matrix $P(i,j)$ can be calculated. In accordance with the teachings of the present invention, a block in the current frame will be corrupted through motion compensation if it references corrupted data (i.e., pixels) in the previous frame. To compute this probability, the blocks are grouped into four categories characterized by their motion vectors (MVs). The first category is for blocks that have MVs corresponding to "no motion" or "low motion". The second category is for blocks that have MVs corresponding to horizontal or vertical motion—each of these blocks references two blocks in the previous frame. The third category is for blocks that have MVs corresponding to combined horizontal and vertical motion—each of these blocks references four blocks in the previous frame. The last category is for I-blocks that have no associated MVs. For each category of block, the probability that a block of that type is corrupted via motion compensation can be computed.

For I-blocks, the probability of an I-block being corrupted by motion compensation is clearly zero. However, for a block with "no motion" or "low motion", the probability of corruption is nearly "one" if it references a corrupted block. For no- or low-motion blocks, the probability of corruption is simply the probability that a block in the referenced frame is corrupted, which can be estimated by the proportion of blocks in the previous frame that are corrupted, denoted r.

The other categories of blocks reference either two or four blocks in the previous frame, and the reference blocks may or may not be corrupted. The probability that a block references one or more corrupt blocks can be described by a binomial distribution, and for each reference block it can be assumed that there is a uniform distribution of corruption from minimum to complete corruption. Therefore, the final equation for the probability that a block is corrupted through motion compensation, p, can be expressed as follows:

$$E\left[\frac{X_{n,loss}}{slice}\right] = \sum_{i=0}^{l-1} \{(l-i)[P(\text{block } i \text{ through block } (l-1) \text{ are lost})]\} \quad \text{(Eq. 10)}$$

where $block_i$ is one of the four possible categories of blocks—$i=1$ is a block of no or low motion, $i=2$ is a block of horizontal or vertical motion, $i=3$ is a block of combined horizontal and vertical motion, and $i=4$ is an I-block; and $a_1$, $a_2$, and $a_3$ are the probability of referencing corrupted data in blocks of category $block_1$, $block_2$, and $block_3$, respectively.

In accordance with the present invention, the developed model incorporates the effect of using additional I-blocks for temporal resilience. In equation (10), the probability of all four categories of blocks must sum to one. As the proportion of I-blocks, denoted $P(block_4)$, increases, the probability of receiving the other blocks $P(block_1)+P(block_2)+P(block_3)$, decreases. This decreases p, the probability that a block is corrupted via motion compensation. FIG. 14 illustrates this probability, showing the invariant (i.e., steady state) distribution of the Markov model with a BER=$5\times10^{-4}$, and two different probabilities of I blocks, $P(block_4)$. As shown, on average there are fewer corrupted blocks as the probability of I-blocks increases.

As described thus far, the models of the present invention are generic in how they capture the propagation of corruption. However, these models have parameters that must be estimated for each specific video. In particular, the models require source-specific inputs characterizing motion and spatial energy. The motion vectors are used in estimating the effect of motion compensation. The spatial energy of the video is used to estimate the distortion (i.e., MSE) that results from block losses and corruption. An additional input to the models is the average number of bits per block that is used to determine the probability that a block is lost due to bit errors. The following describes an exemplary method for estimating the value of these parameters.

In particular, the estimation of the distribution of the four categories of motion blocks can be accomplished by keeping count of the total number of blocks in each of the first three categories by looking at their MVs. The count of I-blocks is kept separately. In accordance with the model of the present invention, this same distribution of blocks will be maintained, even as the proportion of I-blocks increases. Another content-specific parameter is the spatial energy in the video. The spatial and temporal models produce results in terms of lost blocks and corruption, respectively. These measures of corruption need to be converted into estimates of distortion so that rate distortion theory can be applied. For the purposes of the present invention, mean square error (MSE) can be used as a measure of distortion. In block-based encoding methods, not all blocks produce equal distortion in a video. Usually, losing blocks from an I-frame carries a higher penalty than losing blocks from a P-frame. This is because blocks in I-frames usually have a higher spatial energy. The MSE can be estimated by uniformly deleting spaced blocks in both I-frames and P-frames at the decoder and measuring the amount of distortion produced in the video. For deleted blocks in P-frames, the lost blocks can be replaced with blocks from the previous frame in the same spatial location.

To summarize, the spatial model, including spatial resilience, is described by equation (2) for bit errors and equation (3) for burst errors. From each of these models, an expected number of lost blocks, $E[X_n]$ can be computed. These spatial modes are then folded into the overall corruption-propagation model via equation (5), that defines the total number of corrupted blocks. The overall propagation is described by the Markov model of equation (7), showing how the corrupted blocks, $X_n$, propagate from frame to frame.

The temporal and spatial localization techniques of the present invention improve resilience at the cost of an increase in the overall bit rate. Therefore, rate reduction techniques are used to recover bit rate so as to accommodate that necessary for the improved resilience. These techniques fall into two general classes: re-quantizing coefficients and discarding coefficients. In accordance with the present invention, the relatively simple approach of discarding coefficients is used to reduce the rate in a given frame. In particular, a zonal mask is used to remove the low frequency components. It is been found that at lower bit rates, however, the more efficient method of re-quantization may be necessary to recover sufficient bit rate.

Since the bit rate can be allocated over a vector of resources, it is possible to allocate the bit rate optimally to minimize the distortion in the video. Applying rate distortion theory to this problem, the goal is to find a vector of rates that minimizes the overall distortion measure subject to a rate constraint. Solving this constrained optimization problem is equivalent to solving the unconstrained optimization problem with an objective function. Given that there is at least one solution to this problem, the solutions exist at the points where the slopes of the rate distortion functions are equal, and the sum of the rates are less than or equal to the available bit rate. For the purposes of the present invention, the vector of resources comprises the spatial resilience, temporal resilience and the source rate. An additional constraint is that these resources must vary in discrete amounts. For example, the slice lengths may vary only in integer values from one to 22. Therefore, the bit rates used by the resources will necessarily vary in discrete amounts. In addition, the effect of MSE due to source rate is perceptually different than the effect of MSE due to resilience. In particular, decreasing the source rate tends to blur the video, while decreasing spatial and temporal resilience tends to increase the number of severe artifacts. For these severe artifacts, several blocks of the video may change color, or parts of the video become mismatched. Therefore, a certain amount of judgement must be applied when selecting the optimal solution.

Figure 15:
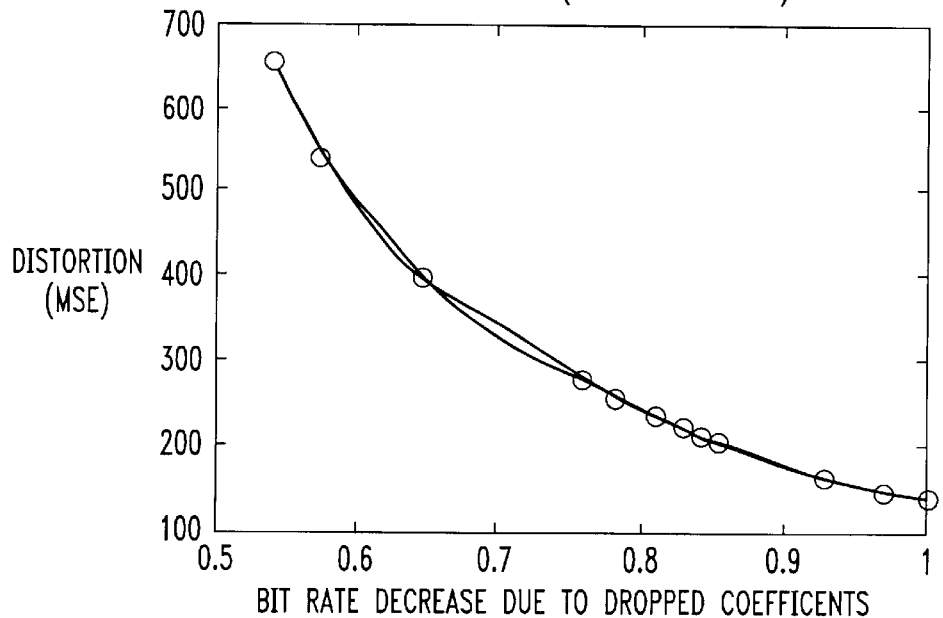
FIGS. 15 and 16 illustrate the optimal rate distortion function (RDF) and the slope of the RDF associated with the source rate.
Figure 16:
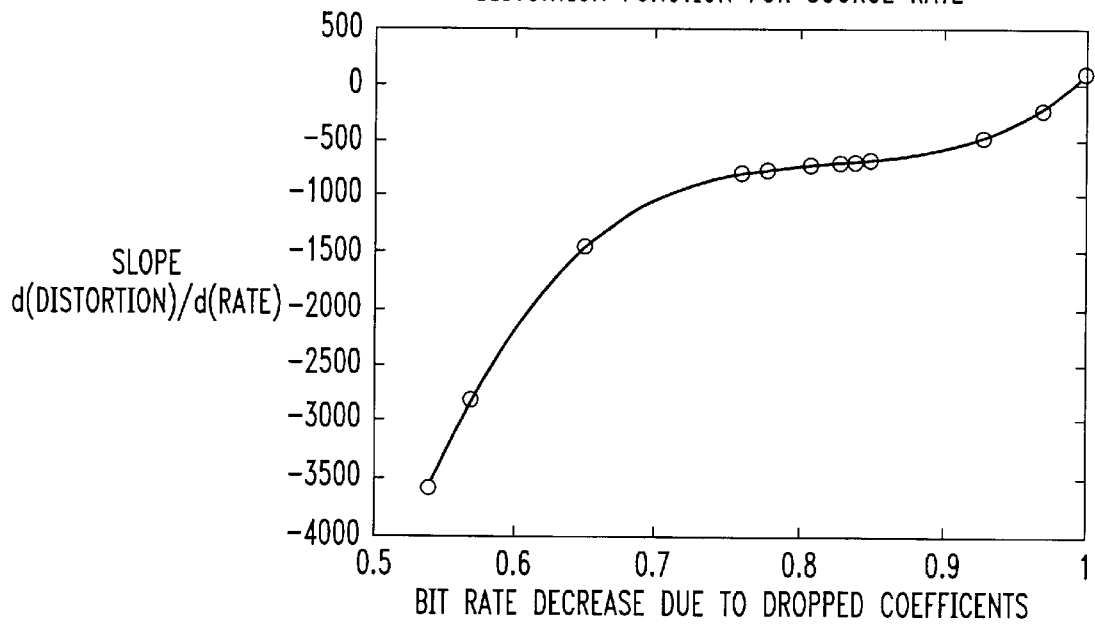
Figure 17:
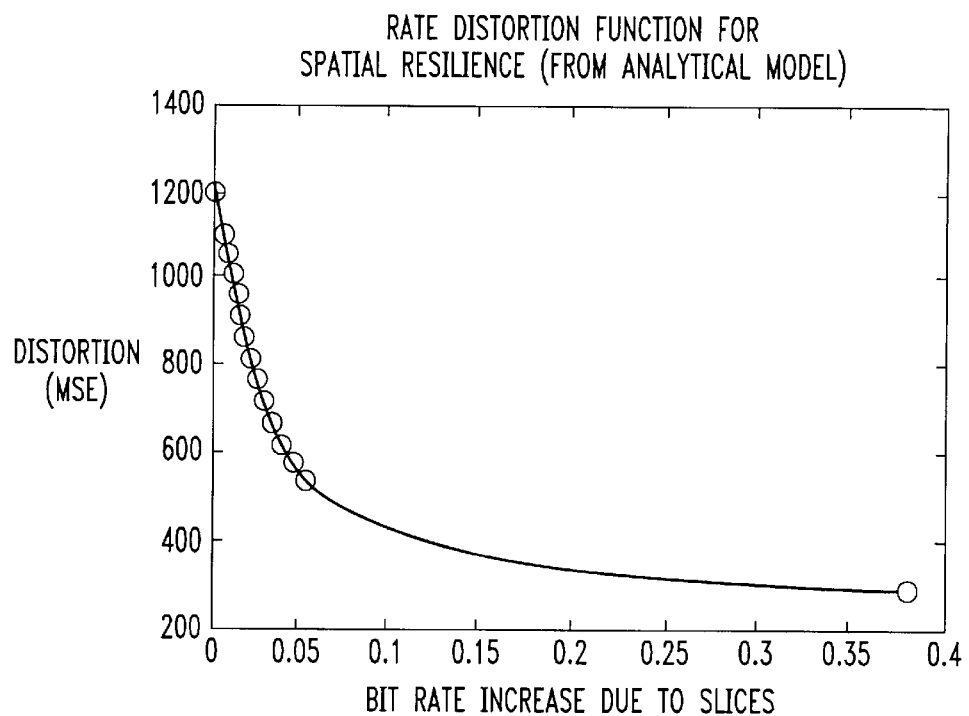
FIGS. 17 and 18 illustrate the RDF and slope associated with spatial resilience.
Figure 18:
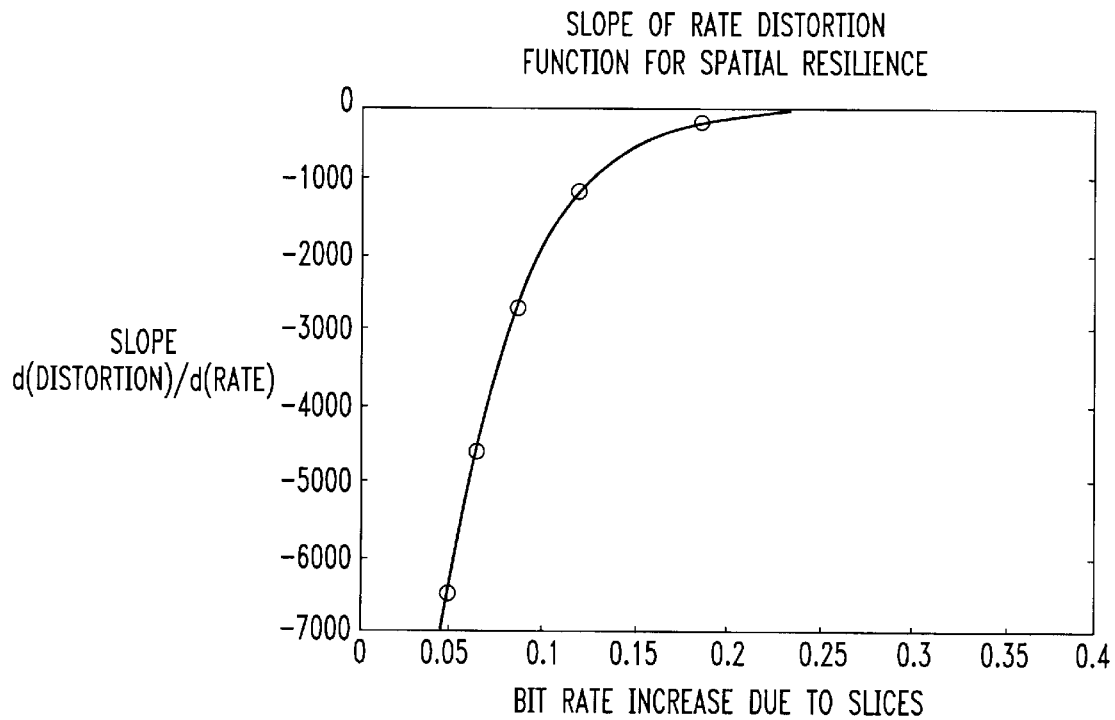
Figure 19:
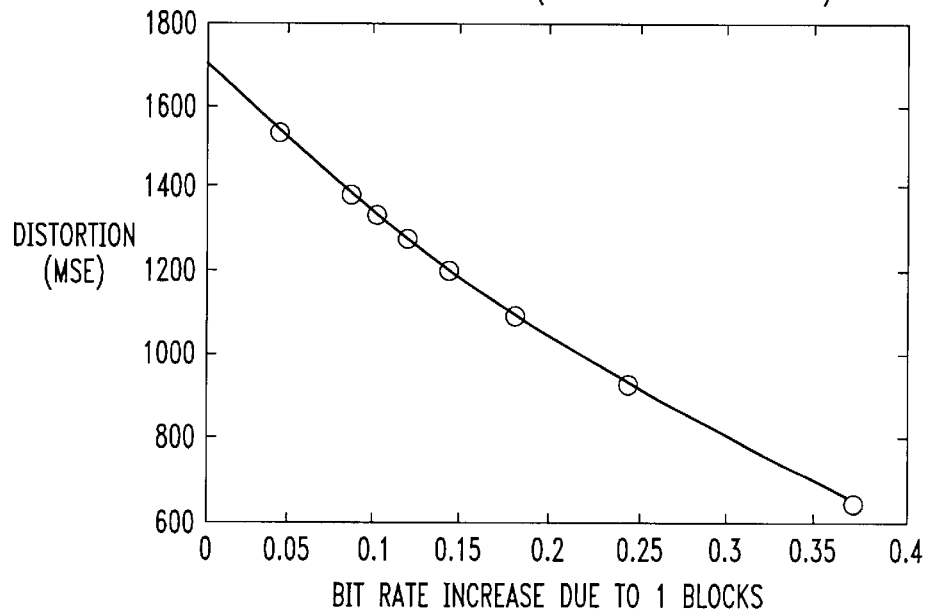
FIGS. 19 and 20 illustrated the RDF and slope associated with temporal resilience.
Figure 20:
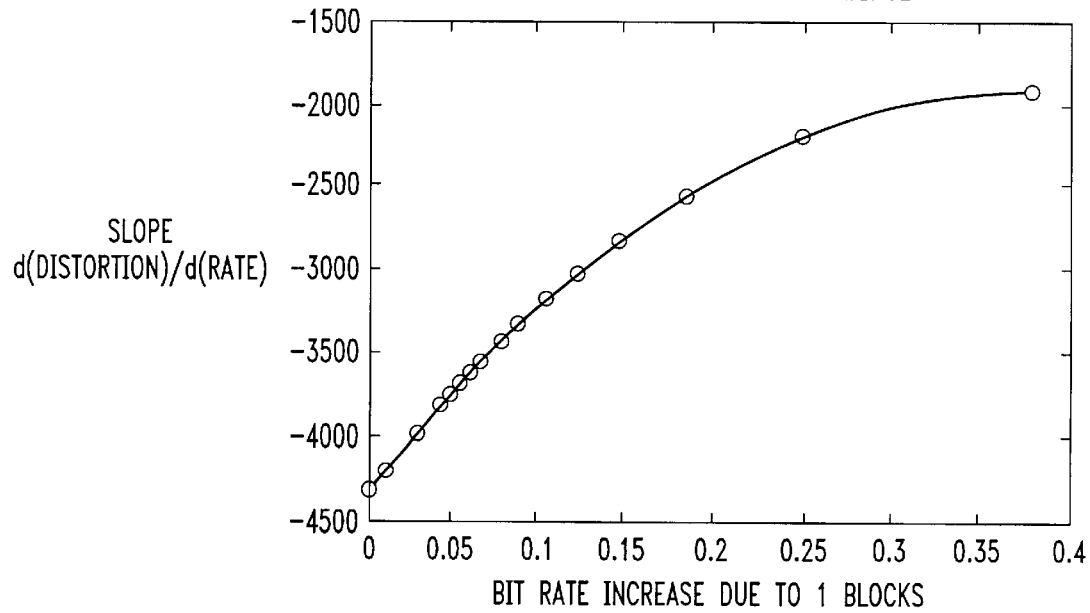

In order to determine the optical allocation of bit rate, the rate distortion function (RDF) is first calculated. The RDF for source rate is operational, generated from simulation, while the RDFs for spatial and temporal resilience are generated from the above-described analytical models. FIGS. 15 and 16 illustrate the optimal RDF for source rate (from simulation) and the slope of the operational RDF for source rate. In particular, FIG. 15 illustrates, for source rate, the RDF at a BER of $5\times10^{-4}$. The data points for the RDF in FIG. 15 are curve fit, then differentiated to form the slope curve as shown in FIG. 16. The x-axes in FIGS. 15 and 16 are the ratio of the resulting bit rate when coefficients are dropped to the original bit rate with all coefficients. FIGS. 17 and 18 illustrate the RDF and slope associated with spatial resilience (i.e., slice length). The y-axis of FIG. 18, associated with the slope of the spatial resilience RDF, is scaled to highlight the area of interest. Lastly, FIGS. 19 and 20 illustrate the RDF and slope associated with temporal resilience. For both spatial and temporal resilience, the x-axes are the ratio of the resulting bit rate when resilience is added to the baseline resilience (minus 1).

In accordance with the present invention, the optimal operating point at each BER is then selected by matching the slopes of the RDF for source, spatial and temporal (FIGS. 16, 18 and 20) while maintaining the total bit rate to be nearly equal to the input bit rate. FIG. 21 illustrates the optimal operating point, combining the results of FIGS. 16, 18 and 20, as a function of BER. As shown, spatial and temporal resilience increase with BER, as the source rate decreases. In particular, as BER increases, the source rate goes down as fewer coefficients are retained. Spatial resilience increases as the number of blocks per slice decreases. Temporal resilience also increases as the number of frames needed to refresh each I-block decreases.

In accordance with the present invention, video quality improves with the optimal resilience. That is, using the resilience models and rate distortion method described above, transcoder 16 can compute the optimal resilience. Transcoder 16 can extract from the incoming bitstream all of the information needed to estimate the parameters required by the models to compute the optimal resilience. With the functionality described above, transcoder 16 can inject the optimal resilience into the encoded bitstream and maintain the optimal resilience to accommodate the prevailing channel conditions. As discussed above, transcoder 16 also receives as an input the channel BER from measurements made by the wireless system. Transcoder 16 is capable of calculating the optimal resilience in either an "off-line" mode, or in real time (subject to some buffering delays at the input and output).

The operating point for a video transmission system of the present invention selects operating points (as shown in FIG. 21) according to the criteria dictated by rate distortion theory and the results can be generated through simulation. For example, the above transcoding can be applied to a video sequence Stefan encoded in CIF format at 384 kps and 10 frames per second. The resulting video quality using the optimal operating points is shown in FIG. 22. Also illustrated in FIG. 22, for the sake of comparison, is a baseline video having an initial I-frame only and a synchronization header every 22 blocks. FIG. 22 shows that using the transcoder of the present invention improves the video quality by about 4.5 dB at higher BERs, while the improvement narrows as the bit error rate decreases. At very low bit error rates, the overhead of resilience outweighs the benefits, and the optimal resilience dictates a minimum resilience at the same level as the baseline video.

To implement the above-described resilience techniques, transcoder 16 must be able to compute the optimal resilience as described above, but in near-real time. An important aspect of the present invention is associated with estimating the content-specific parameters. An exemplary methodology for determining these parameters is shown in the flowchart of FIG. 23. The process begins (block 80) at a "scene change", since between scene changes the content-specific parameters will not often significantly vary. At a recognized scene change, the parameters to be assessed include: (1) the distribution of motion vectors; (2) the average number of bits per block; (3) the MSE contribution per block, and (4) the MSE and bit rate per number of coefficients retained. Each of these parameters is estimated from a relatively small number of frames. The motion vector distribution is estimated using the method described above, except that only blocks from two to three P-frames are counted. The average number of bits per block is also estimated from the first few frames. However, the estimate accounts for the fact that the initial I-frame will contain more bits per block than the following P-frames.

For each video sequence, there is a large MSE at the beginning of the sequence due to initial block losses and coding. This MSE then drops off to a lower steady state value even as bit error losses and motion compensation corruption continue. The MSE contribution for the initial losses, therefore, can be estimated by deleting blocks in the first few frames of the decoded video within the transcoder. However, the steady state losses cannot be computed from only these frames. Therefore, it is proposed to use an initial value for the steady state MSE based on a number of off-line estimates from video sequences. During actual system operation, this initial value can be refined as necessary as the video sequence is being decoded in the transcoder.

Next, the source rate operational RDF is computed (block 82) from the decoded video signal within transcoder 16. As mentioned above, these estimates must take into account the differences between the effects of retaining coefficients for the I-frame and P-frames. Following this, the spatial and temporal resilience are computed (block 84) from the above-described models, after the content-specific parameters have been estimated. The above parameters can be extracted from the bitstream since they only depend on the video content. However, the RDF for the effects of spatial and temporal resilience cannot be extracted at the transcoder since they depend on the effects of the channel that can only be seen downstream of the transcoder. From the RDF, the RDF slopes can then be computed, where the actual optical resilience is then computed by matching the RDF slopes within the bit rate limit (block 86).

In summary, the present invention relates to a method and system for maintaining the quality of video transported over wireless channels by using a transcoder to modify and maintain the optical resilience of an encoded bitstream. The transcoder increases the spatial resilience by reducing the number of blocks per slice, and it increases the temporal resilience by increasing the proportion of I-blocks that are transmitted each frame. Also, the transcoder maintains the same input bit rate by dropping less significant coefficients as it increases resilience. The transcoder of the present invention maintains the resilience at an optimal level to accommodate the prevailing channel conditions as measured by BER. Rate distortion theory is applied to determine the optimal allocation of bit rate among spatial resilience, temporal resilience and source rate, where it is has been found that the optimal allocation of the present invention (which occurs in near-real time) provides nearly the same result as doing an exhaustive search.

What is claimed is:

1. Apparatus for providing transmission of a video signal comprising
    an encoder for applying coding at a predetermined bit rate to a video signal to generate an encoded video bit stream;
    a first, wired network for transmitting the encoded video bit stream;
    a second, wireless network coupled to the first, wired network for further transmitting the encoded video bit stream;
    a decoder for recovering the original video signal from the encoded video bit stream transmitted by the second, wireless network; and a video transcoder disposed between the first, wired network and the second, wireless network for determining predetermined characteristics of the second, wireless network and modifying spatial and temporal resilience in the encoded video bit stream, as a function of the predetermined characteristics and re-encoding said video bit stream, at the predetermined bit rate, incorporating the spatial and temporal resilience modifications.

2. Apparatus as defined in claim 1 wherein the video transcoder determines the bit error rate of the second, wireless channel and uses said bit error rate to determine the spatial and temporal resilience to be applied to the incoming video bit stream.

3. Apparatus as defined in claim 1 wherein the transcoder includes a filter for reducing the bit rate of the resilience-added bit stream to generate a resilience-added bit stream at the predetermined bit rate.

4. A method of adding error resilience to an encoded video signal to be transmitted over a wireless communication channel, the video signal encoded at a predetermined bit rate and the wireless communication channel exhibiting a predetermined bit error rate, the method comprising the steps of
   a) partially decoding the encoded video signal, prior to transmission over the wireless channel, to determine the video content of said encoded video signal;
   b) applying spatial resilience into the partially decoded video signal, based upon the bit error rate of the wireless channel;
   c) applying temporal resilience into the partially decoded video signal, based upon the bit error rate of the wireless channel;
   d) reducing the bit rate of a signal generated in steps b) and c) to an original bit rate; and
   e) re-encoding the video signal of step d) for transmission over the wireless communication channel.

5. The method as defined in claim 4 wherein in performing step b), spatial resilience is applied by inserting additional slice headers into the partially decoded video signal.

6. The method as defined in claim 4 wherein in performing step c), temporal resilience is applied by adding more I-blocks to the partially decoded video signal.

7. The method as defined in claim 4 wherein in performing step d), the bit rate is reduced by removing low frequency coefficients.

8. The method as defined in claim 4 wherein a number of bits distributed between spatial resilience, temporal resilience and the predetermined bit rate is determined by the steps of:
   f) determining the rate distortion function for the predetermine bit rate;
   g) determining the rate distortion function for the spatial resilience;
   h) determining the rate distortion function for the temporal resilience;
   i) determining the slope of each rate distortion function from steps f)–h); and
   j) matching the slopes determined in step ii) to determined an optimal operating point for a predetermined wireless channel bit error rate.

* * * * *